Figure 1:
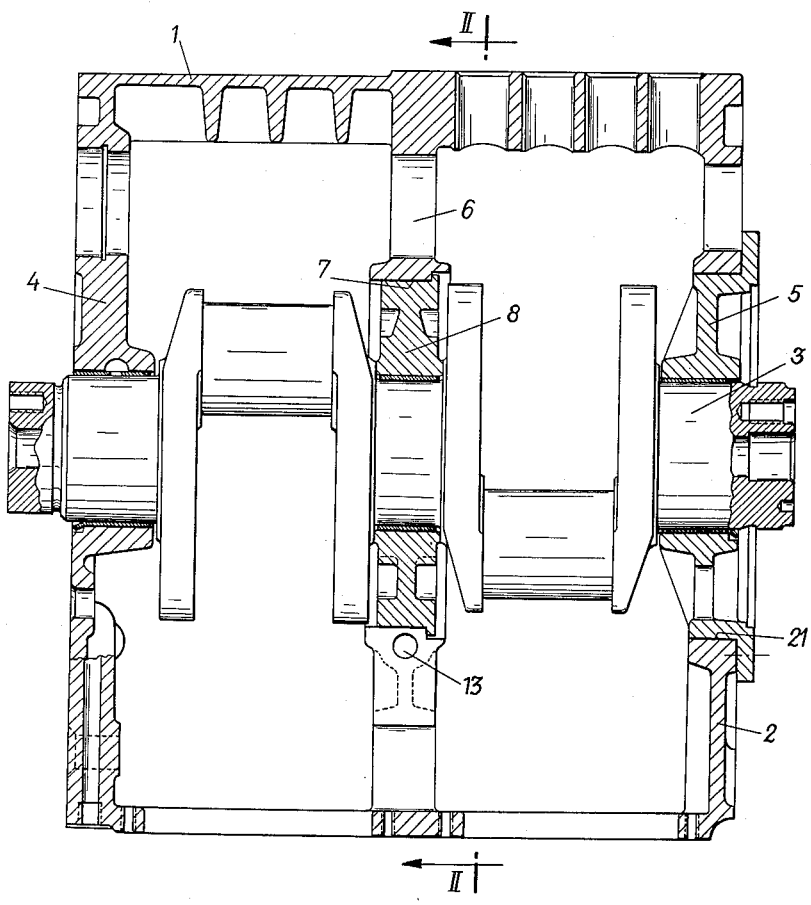

Dec. 19, 1961  F. FREYN  3,013,542
COMBUSTION ENGINE WITH CRANKCASE COMPRISING A UNITARY CASTING
Filed June 30, 1960  2 Sheets-Sheet 1

Dec. 19, 1961  F. FREYN  3,013,542
COMBUSTION ENGINE WITH CRANKCASE COMPRISING A UNITARY CASTING
Filed June 30, 1960  2 Sheets-Sheet 2

United States Patent Office 3,013,542
Patented Dec. 19, 1961

3,013,542
COMBUSTION ENGINE WITH CRANKCASE COMPRISING A UNITARY CASTING
Fritz Freyn, Graz, Austria, assignor to Hans List, Graz, Austria
Filed June 30, 1960, Ser. No. 39,994
Claims priority, application Austria July 6, 1959
6 Claims. (Cl. 123—55)

The invention relates to an internal combustion engine with a crankcase comprising a unitary casting, in particular with V-arranged cylinders, where the crankshaft and the annexed balance weights, if any, can be introduced axially in the crankcase from a front end, the crankshaft bearing brackets resting on cylindrical seats in the crankcase.

It has already been suggested in connection with this type of internal combustion engines to arrange the bearing brackets of the crankshaft bearings located inside the crankcase in cylindrical seats on partitions of the crankcase. In one known design the bearing bracket comprises an upper half centrally located in the cylindrical seat and a lower half defining a bearing cap and secured to the upper half of the bearing bracket by means of bolts. The upper half of the bearing bracket is braced with the crankcase by means of tie rods extending parallel to the cylinder axis and suspended in the crankcase, whereas the lower half is connected with the crankcase through the upper half. For this reason there is no positive connection between the lower half of the bearing bracket and the crankcase, as a result of which the forces applied to the bearing brackets are wholly taken up by the tie rods and thus transmitted to the upper half of the crankcase only. The resulting unequal load of the crankcase is most objectionable.

According to another known design wherein the bearing bracket also comprises an upper half resting in a cylindrical seat of the partition and a lower half defining a bearing cap, the tie rods extend from the lower half of the bearing brackets through both halves and terminate in tapholes provided above the seat in the partition of the crankcase. In this case, too, there is no positive connection between the lower half of the bearing bracket and the crankcase. To make matters worse still, the tie rods for fixing and loosening the bearing brackets are not easily accessible.

Likewise, it has been known to design the lower half of the bearing box in the shape of a circular ring segment and to attach it with the interposition of an equally segment-shaped spacer by means of anchor screws to the crankcase, said anchor screws being introduced from outside through the wall of the crankcase, extending through the spacers and screwed into nuts located in the bearing box. This arrangement does provide a positive connection between the lower bearing box and the crankcase only, but there is no connection at all between the upper half of the bearing and the crankcase. Another disadvantage of this arrangement lies in the fact that the spacers provided between the lower half of the bearing and the crankcase represent an additional expense and that additional openings have to be provided for in the crankcase walls for the purpose of introducing the said spacers into the crankcase.

Finally, the bearing brackets of the crankshaft bearings are known to have been clamped down in the cylindrical seats. For that purpose, several suggestions have been published where either tapered clamping rings are inserted between the bearing brackets and the cylindrical seats or other complicated clamping devices have to be provided for bracing the bearing brackets in the seats. One design provides for adapter sleeves to be introduced in the crankcase from outside and arranged therein in transverse relation to the longitudinal axis of the crankshaft, said sleeves extending through the seat of the bearing brackets. These adapter sleeves are split lengthwise, having a double-cone internal bore and are expanded by means of clamping studs with a tapered head and a conical bolt nut. In yet another design the bearing bracket presents a recess bridged over by a clamp bolt. The bearing bracket is expanded and thus braced in the cylindrical seat by turning the clamp bolt. The main shortcoming of these designs lies in the comparatively large number of parts required to produce the clamping connection as well as in the complicated set-up of these devices involving considerable expense not only in production but also for their installation. In addition, the bolts provided for the purpose are either of difficult access or can be operated with special tools only.

In order to eliminate the drawbacks inherent in the known designs it is proposed according to the invention to design each partition or the like receiving a bearing bracket with a slot extending from the seat and to provide at least one draw-in bolt in transverse relation to the plane of the slot for the purpose of clamping the bearing bracket on its seat. Thus the arrangement according to the invention provides for a positive connection between the entire periphery of the bearing bracket and the cylindrical seat in the partition of the crankcase and also produces a positive connection with the bottom of the crankcase, so that the entire crankcase participates in the absorption of the combustion forces.

As compared with the conventional designs incorporating clamping connections between the bearing brackets and the partitions of the crankcase, the device according to the invention distinguishes itself by its particular simplicity both in design and installation.

It is true that it has been known to provide draw-in bolts extending transversely to the clamping bolts interconnecting the two halves of the bearing and not extending through the crankcase, the partitions presenting recesses of greater width than the diameter of the bearing cups and comprising spacers serving simultaneously as bearing cups. In that case, no bearing brackets proper are provided but the bearing cups are located directly in the partitions. The draw-in bolts extend through the spacers and serve as a positive connection between the latter and the partitions. With this arrangement the bearing cups can be assembled inside the crankcase only. In another known design with recesses in the partitions and spacers inserted therein, bearing brackets are provided but a rippled wire spring is located between the bearing bracket and the seat, said spring being loaded by the insertion of the spacer and maintaining the bearing bracket in its seat. However, in both designs the draw-in bolts do not serve to narrow the seat but to fix the spacers between the partitions. Another disadvantage inherent in this design resides in the fact that the surface of the spacers in contact with the crankcase must present a fitting area.

According to a preferred embodiment of the invention the slot is provided in the vertical plane extending through the axis of the crankshaft below the bearing and the draw-in bolt extends through the crankcase horizontally. This design proved to be particularly advantageous since the draw-in bolt located above the oil sump in transverse relation to the crankcase produces a favorable distribution of forces and furthermore, the extremities of the draw-in bolt are easily accessible. The bolthead and the nut of the draw-in bolt are preferably countersunk in the crankcase and the exit openings of the draw-in bolt in the crankcase are sealed.

According to another feature of the invention, the bearing bracket can additionally and in a manner known per se be braced within the crankcase by tie-rods suspended in the crankcase. This design may prove necessary in certain cases in order to achieve a particularly secure and positive connection between the bearing bracket and the crankcase.

Figure 2:
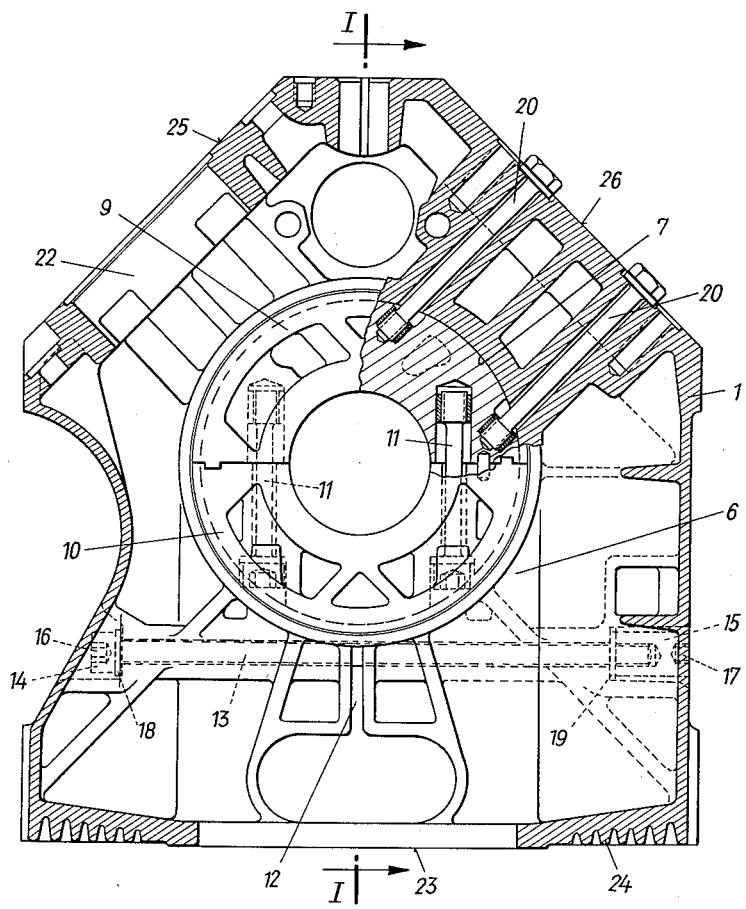

Further objects and advantages of the invention will be more apparent from the following detailed description of one simplified embodiment thereof, reference being made to the accompanying drawings in which:

FIG. 1 is a sectional elevational view of the crankcase according to section line I—I of FIG. 2, FIG. 2 is a transverse sectional elevational view taken as indicated by line II—II of FIG. 1.

1 designates the crankcase of an internal combustion engine with V-arranged cylinders. The crankcase 1 comprises a unitary casting, one end plate 2 of which presents a bore 21 extending coaxially with the crankshaft axis, the diameter of said bore being such as to permit the introduction of the crankshaft 3 with annexed balance-weights, if any, into the crankcase 1 in axial direction. The crankshaft 3 is directly journaled on the second end plate 4, whereas the bearing at the other end is supported by a bearing bracket 5 flanged with the end plate 2. A partition 6 located inside the crankcase 1 defines a cylindrical seat 7 for an annular bearing bracket 8. As appears from FIG. 2, the bearing bracket 8 consists of two pieces to facilitate its installation, the upper half 9 being connected with the lower half 10 by means of bolts 11.

The partition 6 presents a slot 12 extending from the seat in the direction of the crankshaft axis and located in a vertical plane extending through the crankshaft axis below the bearing bracket 8. A draw-in bolt 13 arranged in perpendicular relation to the plane of the slot extends through the crankcase 1 and when tightened, clamps the bearing bracket on the seat 7. The head 14 and the nut 15 of the draw-in bolt 13 are countersunk in the sidewalls of the crankcase 1 and present a hexagonal recess 16 and 17 respectively to receive a box spanner. Packing rings 18 and 19 are provided at the head 14 and nut 15 of the draw-in bolt 13 for the purpose of sealing the oil sump of the crankcase.

In addition, tie-rods 20 located in perpendicular relation to the surfaces of attachment 25, 26 of the cylinders serve as an additional bracing of the bearing bracket 8 with the crankcase 1. The tie-rods 20 are suspended in the crankcase 1 in such a way that their axes extend parallel to the cylinder axes. The opening shown in FIG. 2 for receiving the left cylinder is designated by reference number 22. The oil sump in the crankcase 1 is closed at the bottom by a cover (not shown) resting on the surface 23. Finally, to improve the oil cooling system, cooling fins 24 extending parallel to the crankshaft axis are provided on the underside of the crankcase 1.

I claim:

1. An internal combustion engine with a crankcase comprising a unitary casting, a crankshaft which can be introduced axially in the crankcase from one end, at least one partition extending in transverse direction through the crankcase and being formed with a substantially cylindrical bearing seat and a slot extending from said bearing seat, a crankshaft bearing located inside the crankcase and comprising an annular bearing bracket resting on said bearing seat in said partition, and a draw-in bolt arranged in transverse relation to said slot and extending through the crankcase for clamping the bearing bracket in position.

2. An internal combustion engine as specified in claim 1, wherein the slot in the partition is located in a perpendicular plane extending through the crankshaft axis and below the bearing bracket, said draw-in bolt extending through the crankcase in horizontal direction.

3. An internal combustion engine as specified in claim 2, and having tie-rods suspended in the crankcase and bracing said bearing bracket additionally.

4. An internal combustion engine with a crankcase comprising a unitary casting and V-arranged cylinders, a crankshaft which can be introduced axially in the crankcase from one end, at least one partition extending in transverse direction through the crankcase and being formed with a substantially cylindrical bearing seat and a slot extending from said bearing seat, a crankshaft bearing located inside the crankcase and comprising an annular bearing bracket resting on said bearing seat in said partition, and a draw-in bolt arranged in transverse relation to said slot and extending through the crankcase for clamping the bearing bracket in position.

5. An internal combustion engine as specified in claim 4, wherein the slot in the partition is located in a perpendicular plane extending through the crankshaft axis and below the bearing bracket, said draw-in bolt extending through the crankcase in horizontal direction.

6. An internal combustion engine as specified in claim 5, and having tie-rods suspended in the crankcase and bracing said bearing bracket additionally.

References Cited in the file of this patent

UNITED STATES PATENTS 2,027,843   Shimer _____ Jan. 14, 1936

FOREIGN PATENTS 591,521   Great Britain _____ Aug. 20, 1947